Patented Oct. 24, 1922.

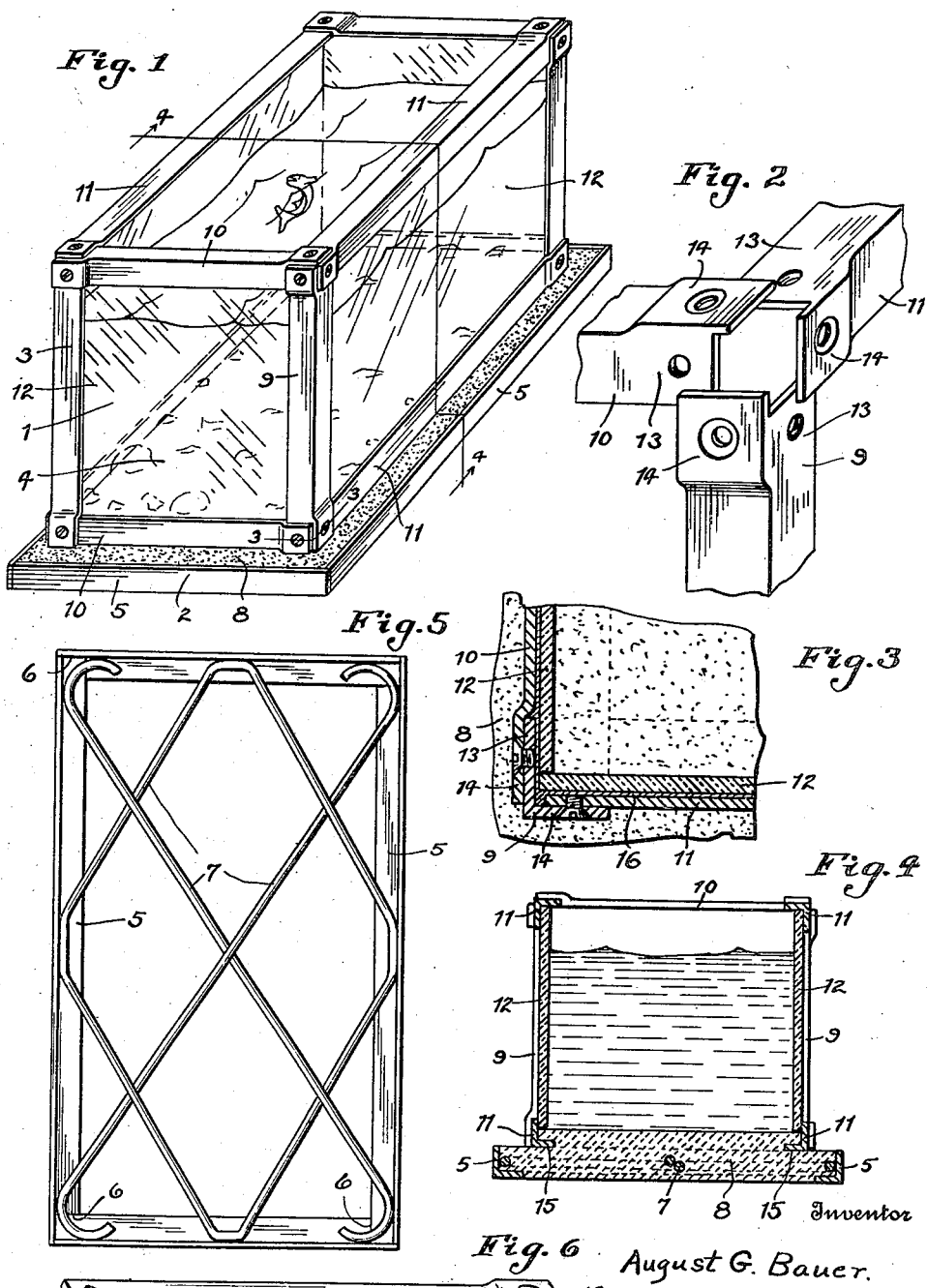

1,432,827

UNITED STATES PATENT OFFICE.

AUGUST G. BAUER, OF COLUMBUS, OHIO.

AQUARIUM STRUCTURE.

Application filed April 29, 1921. Serial No. 465,472.

*To all whom it may concern:*

Be it known that AUGUST G. BAUER, a citizen of the United States, residing at Columbus, in the county of Franklin and State of Ohio, has invented certain new and useful Improvements in Aquarium Structures, of which the following is a specification.

This invention relates to an improved aquarium structure wherein features of construction and design are present which serve to provide a structure of this character wherein the parts thereof are capable of being rigidly and substantially assembled in an efficient and effective manner.

Another object of the invention resides in the provision of an aquarium structure wherein is formed a reinforced monolithic base and a superposed wall frame, the latter being embedded in the base so as to be rigidly and securely supported thereby, and in providing the frame with certain features of construction which operate to permit of the connection of glass panels therewith, and to permit the meeting edges of said panels to be retained in substantially sealed relationship, so that loss of fluid from the structure will be precluded.

With these and other objects in view, as will appear as the description proceeds, the invention accordingly consists in the novel features of construction, combinations of elements and arrangements of parts, hereinafter to be fully described and pointed out in the appended claims.

In the accompanying drawing, forming a part of this specification, and in which similar characters of reference denote like and corresponding parts throughout the several views thereof:

Figure 1 is a perspective view of the improved aquarium structure comprising the present invention and illustrating the same in its assembled, operative or set up position.

Figure 2 is a detail perspective view of the adjoining or meeting ends of the frame member, Figure 3 is a horizontal sectional view taken through said member on the plane indicated by the line 3—3 of Figure 1, Figure 4 is a transverse vertical sectional view taken along the line 4—4 of Figure 1, Figure 5 is a plan view of the base reinforcement, Figure 6 is a perspective view of one of the angle iron sections.

Referring more particularly to the details of the invention, the numeral 1 designates my improved aquarium in its entirety. Essentially, the structure consists of a base 2, a vertically arranged superposed frame 3 and a transparent panel construction 4 capable of being retained in position by reason of the cooperation therewith on the part of said base and frame.

The base 1 in this instance includes a reinforced margin, which consists of united angle iron members 5, having the ends thereof connected to constitute a rectangular frame. As shown in Figure 5, the ends of the angle members 5 are suitably recessed as at 6 in order that said members may neatly interfit, and also to allow the ends thereof to be connected by a welding or other similar process. By so uniting the ends of the angle members a strong and substantial construction is produced, and one wherein the corners are neatly or smoothly finished, so as to present a smooth and attractive appearance and one which will be devoid of sharp externally projecting corners or surfaces. Also, the interior of the frame is provided with diagonally extending cross wires 7, which have their ends secured to the frame 3 by welding or the like. In this skeletonized frame concrete or an equivalent monolithic substance 8 is placed, so that initially the upper surface of the concrete will be substantially flush with the upper edges of the members 5, the wires 7, in combination with the members 5, serve to support and reinforce the concrete substance 8, and to render the base substantial and well balanced in design.

The superposed frame 3 consists of suitably united vertical, transverse and longitudinally extending angle iron sections 9, 10 and 11 respectively, which are adapted to have the meeting or adjoining ends thereof securely united together to produce a substantially rectangular frame. This frame is adapted to retain the transparent sides 12 of the aquarium, and to secure the latter together so that their displacement will be eliminated and undue seepage of fluid from the tank so formed prevented.

As shown, the joints between the angle iron sections 9, 10 and 11 are produced by forming the ends of each of said sections to include plain, smooth sides 13 and offset apertured projections or ears 14. It will be observed that the parts 13 and 14 are reversely disposed on opposite ends of each of the angle iron sections, and by this arrangement the meeting ends of said sections are enabled to be compactly assembled or nested, so that the union produced at each of the corners of the frame 3 will be substantial yet neat in appearance. The several corners of the frame 3 may be united by means of screws or other similar fastening elements which are adapted to be threaded into the apertures formed in the sides 13 and in the ears 14, or if desired the said panels may be welded or otherwise substantially secured together.

It will be observed that the frame 3 is substantially embedded in the concrete base 2. Thus, when the base 2 is initially formed, concrete is poured therein to a level substantially equaling the height of the upper edges of the members 5. Following this the frame 3 is deposited upon the base so that the lower of the transverse and longitudinally extending sections 10 and 11 may rest upon the upper surface of the base end formed. Following the position of the frame 3, the base is further built up by pouring concrete into the frame until the lower of the sections 10 and 11 are filled therewith. Therefore, by this arrangement the said base 2 when completed will be provided with a rectangular recess 15, in which the horizontal legs of the lower sections 10 and 11 will be received and embedded, and firmly retained against undue movement. Following the erection of the sections 9, 10 and 11, the transparent sides 12 are positioned within the frame 3, and are adapted to be retained therein by means of cement or other suitable adhesive 16, the latter is distributed around the inner surfaces of the sections 9, 10 and 11, and serves to securely unite the panels 12 with the inner surfaces of said sections. It will be observed that the panels are situated so that the vertical edges thereof are enabled to abut one another, and by the employment of the adhesive 16, this relationship is maintained, a feature which results in enabling the tank thus produced to retain and hold a liquid without undue loss or seepage thereof.

From the foregoing description, taken in conjunction with the accompanying drawing, it will be apparent that there is provided an aquarium wherein improved features of design and construction are present for the purpose of producing a substantial, economical and efficient construction. The structure is solid and substantial, may be easily erected and when being transported, the several parts thereof may be disassembled and compactly grouped to occupy but a minimum of space. It will be observed that the wires 7 of the base are directly secured to the frame formed by the members 5, in this manner the wires 7 not only serve to reinforce the concrete base, but also to effect the support of the concrete. By means of the screw construction provided in the corners of the frame 3 facility is obtainable in positioning the panels 12, in erecting the frame 3, and in retaining the frame rigid when set up for operation. The construction thus produced while substantial and economical will nevertheless present an attractive appearance, and it is obvious that the various parts may be proportioned and finished so as to present a pleasing, ornamental and artistic appearance.

What is claimed is:

1. An aquarium structure comprising a reinforced concrete base, a frame arranged to be carried by said base, said frame including vertical longitudinal and transverse angle iron sections, means for uniting the meeting ends of said sections, means for securing the lower of said sections to said base, and transparent panels capable of being retained in tank forming relationship by said sections with their lower edges engaged with the base.

2. An aquarium structure comprising a concrete base, a frame arranged to be carried by said base, said frame being formed to provide along the lower edges thereof horizontally disposed inwardly projecting webs, said latter being embedded within said base, and transparent tank forming panels carried by said frame and having their lower edges resting on the base.

3. An aquarium structure comprising a concrete base having a marginal groove provided therein, a frame including angle iron sections having the lowermost of its sections arranged to be received and retained within said groove, and tank forming panels carried by said frame.

4. An aquarium structure comprising a concrete reinforced base, a superposed frame arranged to be rigidly carried by said base, said frame being formed to include a plurality of longitudinal transverse and vertical angle iron sections, each of said sections having the ends thereof formed to include plane smooth apertured sides and offset apertured ears, said sides and ears being arranged relatively reversely at the opposite ends of each of said sections and adapted to cooperate with the similarly formed ends of adjoining sections, whereby a substantially rectangular frame will be produced, and tank forming sides retained by said frame in cooperation with said base.

In testimony whereof I affix my signature.

AUGUST G. BAUER.